(12) United States Patent
Hovanec et al.

(10) Patent No.: US 10,591,897 B2
(45) Date of Patent: Mar. 17, 2020

(54) SYSTEMS AND METHODS OF REDUCING CURL AND WRAP IN ADDITIVE MANUFACTURING

(71) Applicant: Autodesk, Inc., San Rafael, CA (US)

(72) Inventors: Matthew Hovanec, Berkeley, CA (US); Gregory David Meess, Berkeley, CA (US); Kenneth Lawrence Mejia, San Francisco, CA (US)

(73) Assignee: Autodesk, Inc., San Rafael, CA (US)

( * ) Notice: Subject to any disclaimer, the term of this patent is extended or adjusted under 35 U.S.C. 154(b) by 402 days.

(21) Appl. No.: 15/438,514

(22) Filed: Feb. 21, 2017

(65) Prior Publication Data
US 2018/0236728 A1    Aug. 23, 2018

(51) Int. Cl.
| | | |
|---|---|---|
| B29C 64/386 | (2017.01) | |
| G05B 19/4099 | (2006.01) | |
| B33Y 30/00 | (2015.01) | |
| B33Y 50/02 | (2015.01) | |
| B29C 64/106 | (2017.01) | |
| B29K 101/12 | (2006.01) | |

(52) U.S. Cl.
CPC ........ *G05B 19/4099* (2013.01); *B29C 64/106* (2017.08); *B29C 64/386* (2017.08); *B33Y 30/00* (2014.12); *B33Y 50/02* (2014.12); *B29K 2101/12* (2013.01); *G05B 2219/35134* (2013.01); *G05B 2219/49007* (2013.01); *Y02P 90/265* (2015.11)

(58) Field of Classification Search
CPC .......................... B29C 64/393; G05B 19/4099
See application file for complete search history.

(56) References Cited

U.S. PATENT DOCUMENTS

| | | |
|---|---|---|
| 2014/0371895 A1 | 12/2014 | Sadusk et al. |
| 2016/0136903 A1* | 5/2016 | Herran .............. B29C 64/40 264/308 |

OTHER PUBLICATIONS

Unknown Author, "Add Mouse Ears to anything in your Slicer," (Jul. 18, 2016) [online] (retrieved from http://www.thingiverse.com/thing:839635), 1 page.
Unknown Author, "Rafts, Skirts and Brims!," (Jul. 18, 2016) [online] (retrieved from https://www.simplify3d.com/support/tutorials/rafts-skirts-and-brims/), 5 pages.

(Continued)

*Primary Examiner* — Timothy Kennedy
(74) *Attorney, Agent, or Firm* — Fish & Richardson P.C.

(57) ABSTRACT

Methods, systems, and apparatus, including medium-encoded computer program products, for reducing or eliminating curl and wrap in additive manufacturing include, in at least one aspect, obtaining a three dimensional (3D) model of a 3D object to be additively manufactured using a thermoplastic material delivery apparatus; generating a variable width brim for at least a first layer of the 3D model, wherein a width of the brim varies from a maximum value to a minimum value at different locations adjacent at least the first layer of the 3D model, and the generating comprises varying the width of the brim in accordance with an amount of convexity of the 3D model in regions corresponding to the different locations; and outputting the variable width brim for use in preventing warping during the additive manufacturing of the object from the 3D model using the thermoplastic material delivery apparatus.

20 Claims, 5 Drawing Sheets

(56) References Cited

OTHER PUBLICATIONS

Unknown Author, "Diary of a Technocratic Anarchist: Printing the Big Bits of Mendel," (Jul. 18, 2016) [online] (retrieved from http://technocraticanarchist.blogspot.com/2009/12/printing-big-bits-of-mendel.html), 3 pages.
Unknown Author, "Mouse Ears Defeat Corner Curling Monster," (Jul. 18, 2016) [online] (retrieved from http://www.makerbot.com/blog/2011/02/25/mouse-ears-defeat-corner-curling-monster), 8 pages.
Unknown Author, "Fused Filament Fabrication—Wikipedia, the free encyclopedia," (Jul. 18, 2016) [online] (retrieved from https://en.wikipedia.org/wiki/Fused_filament_fabrication), 4 pages.
Unknown Author, "CraftWare 1.09 Is Released," (Jan. 24, 2017) [online] (retrieved from https://craftunique.com/forums/view-thread/931/), 66 pages.
Unknown Author, "Bed Adhesion," (Jul. 18, 2016) [online] (retrieved from https://ultimaker.com/en/resources/257-bed-adhesion), 6 pages.
Unknown Author, "12 Ways to Fight Warping and Curling," (Jul. 18, 2016) [online] (retrieved from http://www.makerbot.com/blog/2011/06/23/12-ways-to-fight-warping-and-curling), 12 pages.
Unknown Author, "3D Slicer Settings: Best Practices," (Jul. 18, 2016) [online] (retrieved from https://pinshape.com/blog/3d-slicer-settings-5-things-you-need-to-know-about-3d-printing . . . ), 17 pages.

\* cited by examiner

SYSTEMS AND METHODS OF REDUCING CURL AND WRAP IN ADDITIVE MANUFACTURING

BACKGROUND

This specification relates to additive manufacturing, such as fused filament fabrication (FFF) three dimensional (3D) printing.

FFF using extruded polymer filament is employed for manufacturing three dimensional objects. Current FFF printing is typically accomplished by forcing a solid plastic feedstock through a heated nozzle. The filament is liquefied before or as it passes through the constriction in the nozzle, and the feed pressure causes material to be extruded to form a beam of material added, layer by layer, to build the object. 3D models of objects can be designed using computer-aided design (CAD) software and then converted to toolpaths for the nozzle of a 3D extrusion printer, either by the CAD software or separate software, often referred to as a slicer.

In addition, when the toolpaths specify long runs of FFF extruded filament, this can result in warped parts as the liquefied extrusion material cools and solidifies. Specifically, warp is most pronounced at convex corners of the part's first few layers. This problem of warped parts becomes even more pronounced as parts increase in size beyond standard consumer FFF 3D printers. Current techniques for warp prevention with FFF 3D printing include the creation of rafts, such as described in U.S. Patent Pub. No. 2014/0371895, and the ad hoc addition of extra extrusion material around the part being 3D printed to help hold down the first few layers.

SUMMARY

This specification relates to additive manufacturing, such as fused filament fabrication (FFF) three dimensional (3D) printing. In general, one or more aspects of the subject matter described in this specification can be embodied in one or more systems that include one or more computer storage media having instructions stored thereon; and one or more data processing apparatus configured to execute the instructions to perform operations including obtaining a three dimensional (3D) model of an object to be additively manufactured using a thermoplastic material delivery apparatus, generating a variable width brim for at least a first layer of the 3D model, wherein a width of the brim varies from a maximum value to a minimum value at different locations adjacent at least the first layer of the 3D model, and the generating includes varying the width of the brim in accordance with an amount of convexity of the 3D model in regions corresponding to the different locations, and outputting the variable width brim for use in preventing warping during the additive manufacturing of the object from the 3D model using the thermoplastic material delivery apparatus.

In some implementations, the minimum value is zero, and the maximum value is a user input value. The operations can include setting the maximum value in accordance with properties of a thermoplastic material to be used by the thermoplastic material delivery apparatus to additively manufacture the object from the 3D model. Other approaches to setting the minimum and maximum values are also possible.

In some implementations, generating the variable width brim can includes: discretizing a perimeter of the first layer of the 3D model to identify discrete points along the perimeter of the first layer of the 3D model; and determining a convexity for a region of the 3D model by calculating at least one angle between at least two lines formed between at least three of the discrete points associated with the region. Generating the variable width brim can include identifying how many of the discrete points are associated with the region based on a window of convexity being measured, and determining the convexity for the region can include calculating a weighted average of angles between at least three lines formed between at least four of the discrete points associated with the region.

In some implementations, varying the width of the brim includes setting the width based on a weighted average of convexity determined for respective layers, including the first layer, of the 3D model. The first layer can be assigned a weight of one, and each succeeding higher layer of the respective layers of the 3D model can be assigned a weight that is less than the weight assigned to the preceding lower layer. Other approaches to weighting are also possible.

In some implementations, generating the variable width brim includes creating a perforated edge in the brim where the brim contacts the 3D model. Creating the perforated edge in the brim can include distributing evenly spaced holes along a perimeter of the first layer of the 3D model. Other approaches to creating a perforated edge in the brim are also possible.

Moreover, the system can include the thermoplastic material delivery apparatus, which can be a Fused Filament Fabrication (FFF) 3D printer or other 3D printer. The operations can include using a 3D modelling program to perform the generating and the varying at a mesh level of the 3D model, and the outputting can include saving the 3D model with the variable width brim added thereto. The operations can include using a slicer program to perform the generating and the varying during conversion of the 3D model to a toolpath domain of the 3D printer, and the outputting can include sending a toolpath specification document to the 3D printer for additive manufacturing, wherein the toolpath specification document includes slices of the 3D model and the variable width brim.

Particular embodiments of the subject matter described in this specification can be implemented to realize one or more of the following advantages. An expanded perimeter can be created algorithmically for a 3D model before 3D printing, where the distance from the part itself for the expanded perimeter is driven by how convex the local perimeter's angle is. This can prevent warping in trouble areas for a part being 3D printed without requiring the use of more filament than is actually necessary for the 3D model at hand. By using excess extrusion material only where it is really needed, the time and cost of 3D printing can be reduced. The time and effort needed to manually design adhesion helpers can be reduced. Moreover, the amount of trial and error by the user of a 3D printer can be reduced, resulting in fewer failed prints and less waste.

The details of one or more implementations of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
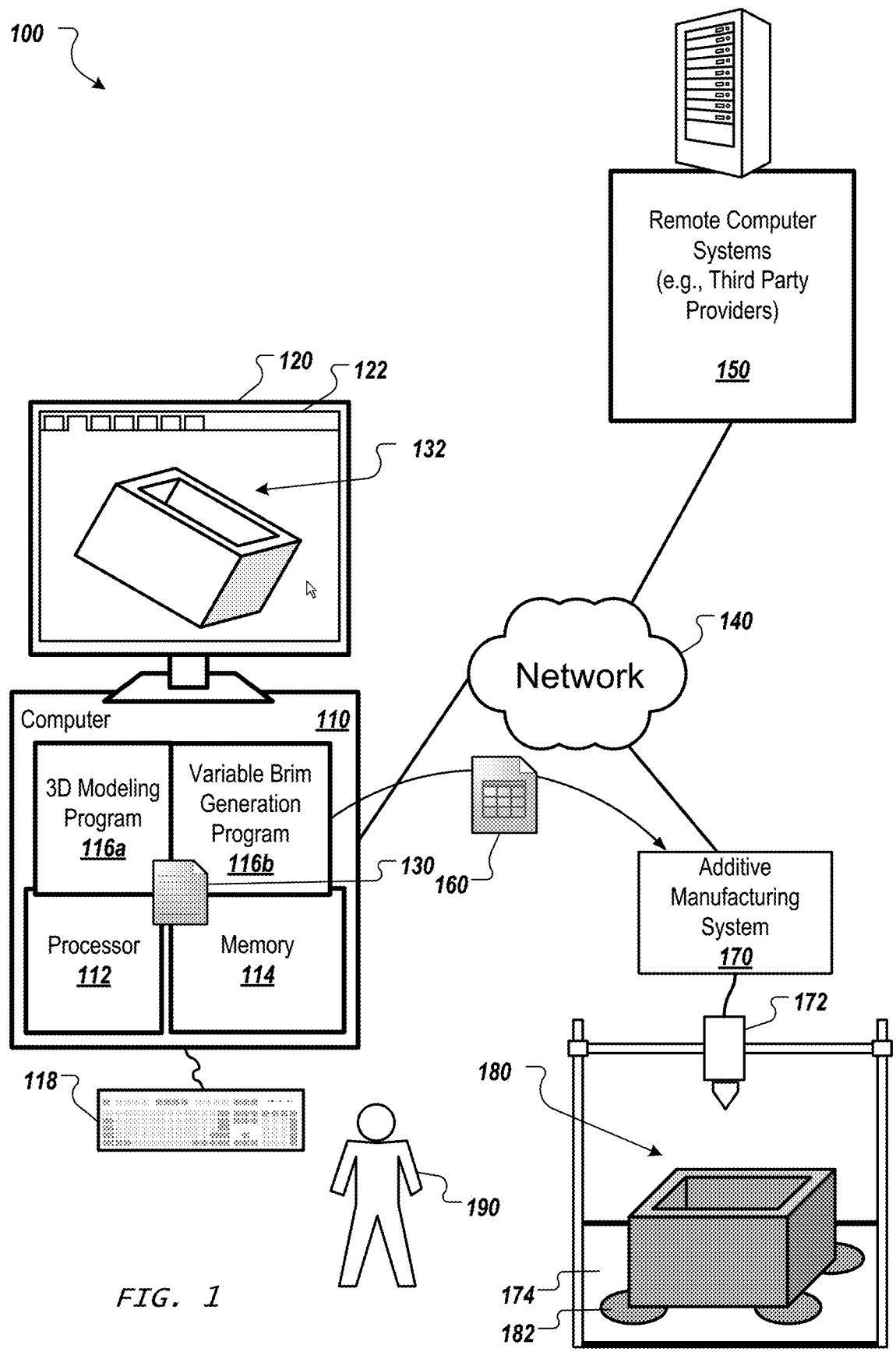
FIG. 1 shows an example of a system to design and manufacture objects using additive manufacturing techniques.

FIG. 1 shows an example of a system 100 to design and manufacture objects using additive manufacturing techniques. A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112.

Such programs can include a 3D modeling program 116a, which can run locally on computer 110, remotely on a computer of one or more remote computer systems 150 (e.g., one or more third party providers' one or more server systems accessible by the computer 110 via the network 140), or both. The 3D modeling program 116a presents a user interface (UI) 122 on a display device 120 of the computer 110, which can be operated using one or more input devices 118 of the computer 110 (e.g., keyboard and mouse). Note that while shown as separate devices in FIG. 1, the display device 120 and/or input devices 118 can also be integrated with each other and/or with the computer 110, such as in a tablet computer.

A user 190 can interact with the 3D modeling program 116a to create a 3D model 132. This can be done using known graphical user interface tools. In the example shown, the 3D model 132 is a hollow square, but such a structure is not required. Rather, various suitable forms of 3D model 132 can be created to represent a wide variety of 3D objects that can be manufactured using additive manufacturing systems and techniques. In some implementations, the programs that run on the processor 112 include a slicer program, a variable width brim generation program 116b, a tool path generation program, etc. Such programs can be separate from the 3D modeling program 116a or integrated into the 3D modeling program 116a or into each other. Thus, a "program" as referenced herein can be a procedure within another program. Moreover, in some implementations, such program(s) run on a processor in an additive manufacturing system 170, which can also include processor(s) and memory and constitute a computer, similar to computer 110.

In various implementations, the 3D modeling program 116a is programmed to provide various user interface elements to enable the user 190 to design the 3D model 132, specify materials and loading cases, perform simulation, etc. Once the user 190 is satisfied with the model 132, the 3D model 132 is stored as a document 130 and/or used to generate another representation of the model (e.g., an .STL file for additive manufacturing). This can be done upon request by the user 190, or in light of the user's request for another action, such as sending the 3D model 132 to the additive manufacturing system 170, which can be directly connected to the computer 110, e.g., integrated with the computer 110, or connected via the network 140, as shown. This can involve a post-process carried out on the local computer 110 or a cloud service to export the 3D model 132 to an electronic document from which to manufacture. Note that an electronic document (which for brevity will simply be referred to as a document) can be a file, but does not necessarily correspond to a file. A document may be stored in a portion of a file that holds other documents, in a single file dedicated to the document in question, or in multiple coordinated files. In any case, the 3D modeling program 116a is used to create the 3D model 132.

The additive manufacturing system 170 includes a thermoplastic material delivery apparatus, e.g., an FFF 3D printer, which includes at least one tool 172 that is moved by a 3D motion system in a build volume to create a 3D object 180, which corresponds to the 3D model 132, on a build platform 174. Although represented in FIG. 1 as an XYZ FFF 3D printer, it should be understood that the additive manufacturing system 170 represents many possible types of 3D printers, including delta 3D printers and other systems that can employ more than one type of tool, including potentially subtractive manufacturing tools. Further, although this disclosure focuses on the delivery of a single thermoplastic material by the additive manufacturing system 170, many different types of materials can be used, either separately or concurrently. Note that a material is described as thermoplastic to indicate that it is capable of softening or fusing when heated and of hardening again when cooled, not to indicate that it is specifically a plastic. Thus, the materials can include one or more types of metals in addition to more traditional FFF materials, such as acrylonitrile butadiene styrene (ABS), polylactic acid (PLA), high-impact polystyrene (HIPS), thermoplastic polyurethane (TPU), aliphatic polyamides (nylon), and polyether ether ketone (PEEK) materials. In general, the materials can include one or more types of thermoplastics, metals, photoresins, or other additive manufacturing material that exhibit expansion, contraction, or both during fabrication.

Regardless of the specific type of thermoplastic material used, a certain amount of shrinkage of the material will occur after it is extruded by the tool 172 onto the build platform 174 and cools. This shrinkage can cause undesirable warping or curl of the 3D object 180 being manufactured. In order to reduce or eliminate such warping or curl, the variable width brim generation program 116b specifies extra material 182 to be deposited along with the 3D object 180. This extra material 182 helps hold down the first layer of the 3D object 180 being manufactured, thus reducing or eliminating warping or curl.

In the example shown, the 3D model 132 is a hollow square, which requires more adhesion to the build platform 174 on its outside corners, while the inside corners may require no extra material to assist with adhesion to the build platform 174. This is due to the fact that warp is most pronounced at convex corners of the 3D object 180. Thus, to prepare the 3D model 132 for 3D printing, the variable width brim generation program 116b is used to specify the locations and extents of this extra material for the 3D model at hand. In some implementations, the variable width brim generation program 116b automatically creates an expanded perimeter for the 3D model (for at least the first layer) based on a measure of convexity for the 3D model when the 3D model 132 is to be built using the additive manufacturing system 170. In some implementations, the variable width brim generation program 116b creates an expanded perimeter for the 3D model (for at least the first layer) based on a measure of convexity for the 3D model in response to user input, such as during the design phase of the 3D model 132.

For example, the variable width brim generation program 116b can be part of the 3D modeling program 116a, and the extra material 182 can be specified by the creation of extra geometry for the 3D model 132 (e.g., boundary representations (Breps), constructive solid geometry (CSG), non-uniform rational basis spline (NURBS), etc.) and stored in the document 130. This extra geometry will thus be part the 3D model 132 when it is converted to a document 160 (of an appropriate format, such as G-code) for use by the additive manufacturing system 170. In other words, the CAD software on the computer 110 can provide the functionality described herein. In other implementations, a slicer (or similar) program can provide the functionality described herein. In such implementations, the extra material 182 is specified when the 3D model 132 is converted into printing instructions for the 3D printer. Note that such implementations include those in which the functionality described herein is performed by a computer in the additive manufacturing system 170. Thus, the algorithms described herein can be done at the mesh level for a 3D object or in the toolpath domain for a 3D printer.

Figure 2A:
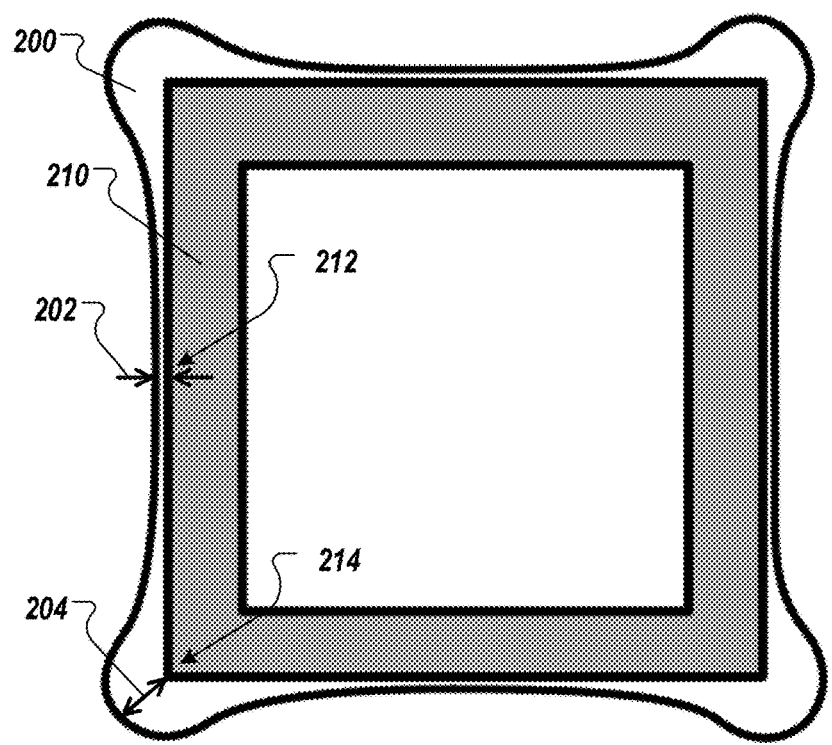
FIGS. 2A and 2B show examples of layers of objects, and associated variable width brims generated therefor, to be additively manufactured using a thermoplastic material delivery apparatus.

FIG. 2A is a top down view (along the Z axis of the print direction) showing an example of a variable width brim 200 generated for a first layer of a hollow square 210. As shown, a width of the brim 200 varies from a minimum value 202 to a maximum value 204 at different locations adjacent the first layer of the hollow square 210. The width of the brim 200 varies in accordance with an amount of convexity of the object in regions near the different locations. Thus, at a region 212 where the exterior of the square 210 is not convex at all, the brim 200 width has the minimum value 202, and at a region 214 where the exterior of the square 210 is very convex, the brim 200 width has the maximum value 204.

In this example, the interior of the square 210 has no convex regions, and thus no brim is created inside the square 210. However, various 3D models can have a wide range of shapes, and thus, a variable width brim can be generated for both interior and exterior regions of the object to be 3D printed. Moreover, in this example, the minimum value 202 is greater than zero, which results in a brim 200 that is a full perimeter of the objection 210, as shown in FIG. 2A. However, in some implementations, the minimum value 202 is set to zero and results in a brim that is not a full perimeter for the object, as shown in FIG. 1.

Figure 2B:
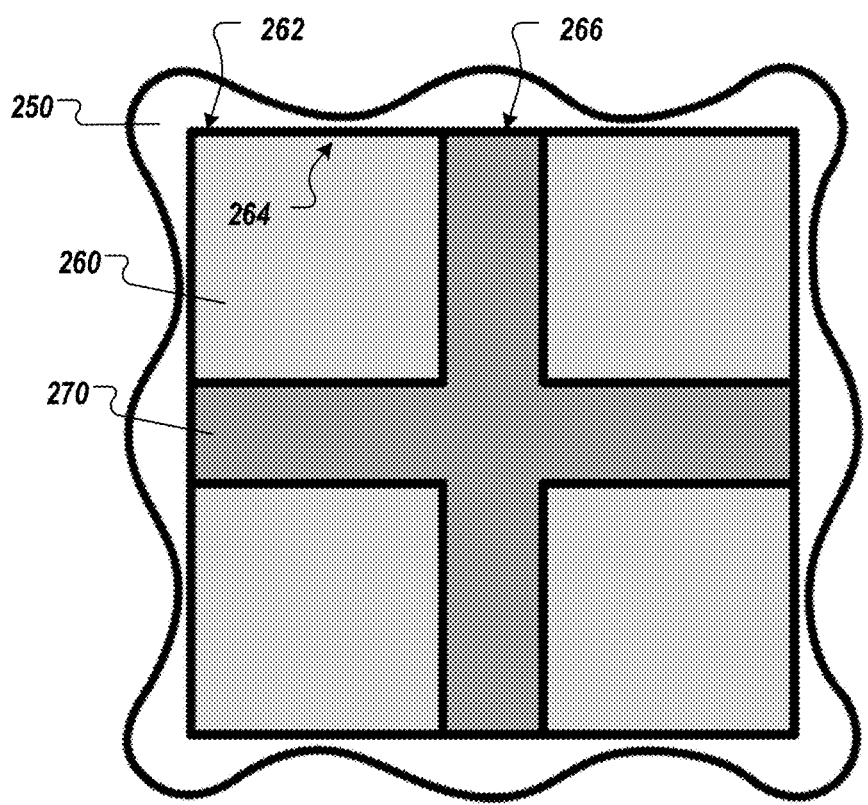

In addition, in some implementations, more than just the first layer is taken into consideration when defining the variable width brim for the object. FIG. 2B shows an example of a variable width brim 250 generated for another object, where the width of the brim 250 is varied in accordance with a weighted average of convexity determined for respective layers, including a first layer, of the 3D model. In this example, the 3D model has a first layer 260 that is a square, and on top of this, the 3D model has multiple layers that are each a plus sign 270. Because of this structure, the higher layers can pull up the first layer 260 as they cool, causing undesirable warping of the 3D printed object.

To address this issue, the variable width brim 250 transitions from being rather wide in a region 262 due to the convexity of the first layer 260 in this region 262, to being rather narrow in a region 264 due to the lack of convexity of the first layer 260 in this region 264, and then back to being rather wide in a region 266 due to the convexity of the higher layers 270. This is true even though the first layer 260 is not convex in the region 266. In some implementations, the width of the brim 250 is driven by a weighted average of the initial N layers of the object projected onto the first layer. This provides the extra adhesion needed by the object, including in regions where the first layer alone does not indicate the need for an extra adhesion offset.

Figure 3:
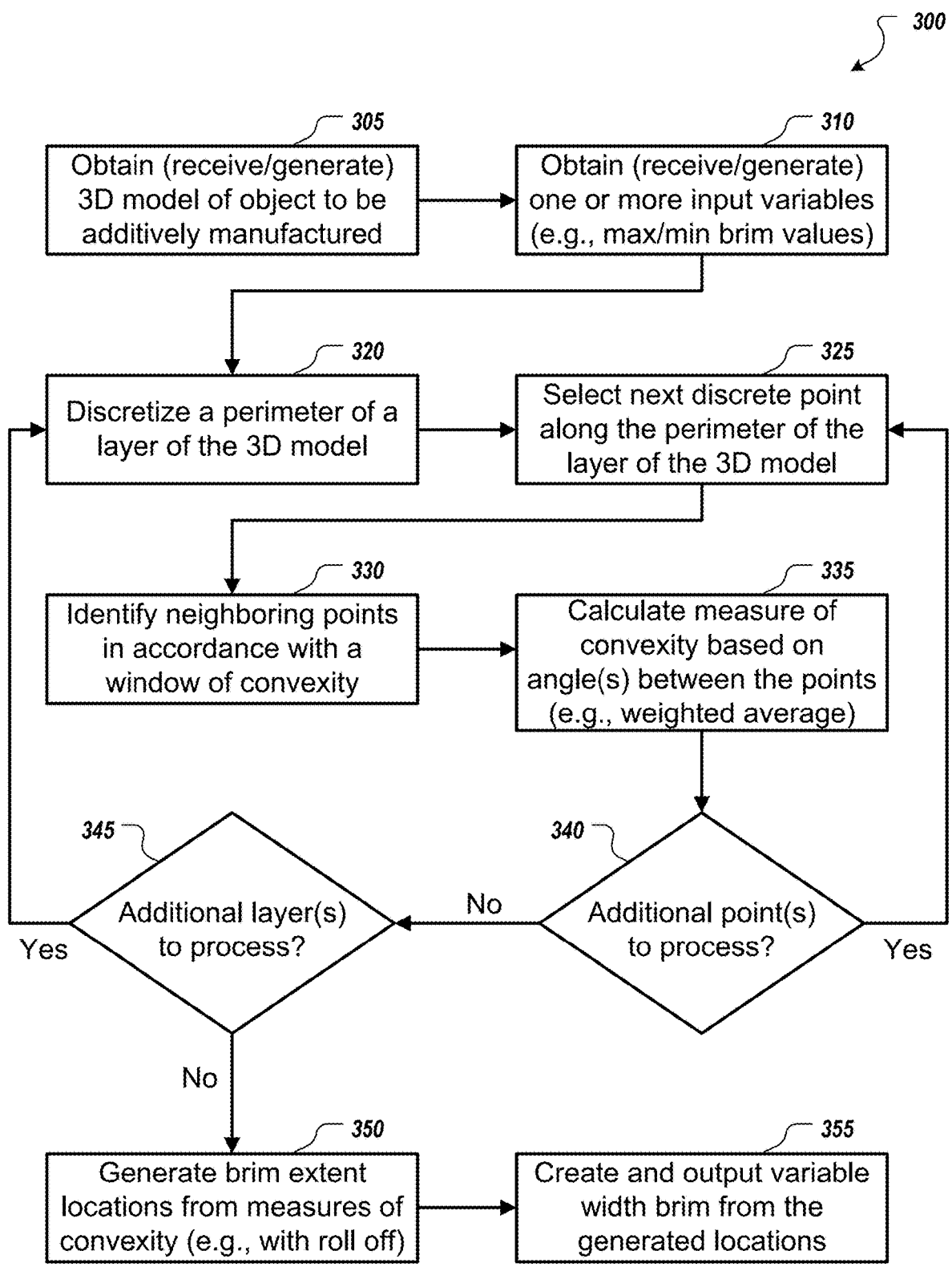
FIG. 3 is a flowchart showing an example of a process for generating variable width brims for 3D models of objects to be 3D printed.

FIG. 3 is a flowchart showing an example of a process 300 for generating variable width brims for 3D models of objects to be 3D printed. A 3D model of an object to be additively manufactured is obtained 305. Obtaining 305 the 3D model can include receiving the 3D model from another source or location, e.g., loading the 3D model from a permanent storage device (e.g., a disk drive). Alternatively or additionally, obtaining 305 the 3D model can include generating the 3D model based on received input (e.g., creating the 3D model in CAD software based on user input).

One or more input variables are obtained 310 for use in the process of generating a variable width brim for the 3D model. Obtaining 310 the one or more input variables can include receiving one or more input variables from a user, loading one or more input variables from a permanent storage device (e.g., a disk drive), receiving or retrieving one or more variables from another program, device or system (e.g., from a 3D printer to be used), or a combination of these. In some implementations, the one or more input variables are the minimum value for the brim width, the maximum value for the brim width, or a combination of these. For example, in some implementations, the maximum value for the brim width is a user input variable. In some implementations, the minimum value for the brim width is set to zero as a default, but a user can optionally provide an input for the minimum value for the brim width.

Other input variables can also be used, such as details of the type(s) of thermoplastic material(s) to be used, nozzle temperature, layer height, and first layer speed, and such variables can be used to define one or more other variable in the process. For example, in some implementations, the maximum value of the brim width is set in accordance with properties of a thermoplastic material to be used by the thermoplastic material delivery apparatus to additively manufacture the object from the 3D model. In some implementations, the maximum value of the brim width is affected by the nozzle temperature, layer height, and first layer speed. Note that different materials have different amounts of shrinkage, which shrinkage can also be dependent upon the nozzle temperature, layer height, and first layer speed, and thus the specific interaction of material and 3D printer settings results in differing amounts of needed brim width. In various implementations, the input variables also include number of perimeters, infill density, number of solid layers before beginning sparse infill, or a combination of one or more of these.

With the input variable(s) obtained, the variable width brim is generated. In some implementations, a perimeter of a layer of the 3D model is discretized 320 to identify discrete points along the perimeter of the layer. This discretization 320 facilitates a process of determining convexity for the 3D model. Note that the use of the word "perimeter" here is not intended to indicate that only an exterior of the whole 3D model is processed. Rather, the perimeter can include an interior region of the 3D model. For example, referring to FIG. 2A, the hollow square 210 has both an exterior perimeter (the outside of the square) and an interior perimeter (the inside of the square). Depending on the details of the 3D model being processed, there can be many perimeters of the 3D model, and all such perimeters of the layer can be discretized 320 for purposes of determining convexity.

In addition, although the word "convexity" is used herein, it will be appreciated that the meaning is interchangeable with concavity, depending on the frame of reference. Referring again to FIG. 2A, the region 214 of the hollow square 210 is convex from a position outside the hollow square 210, but the region 214 is concave from a position inside the hollow square 210. Thus, a measure of convexity (from a perspective that is external to the 3D printed material) can be obtained by measuring concavity (from a perspective that is internal to the 3D printed material).

Figure 4A:
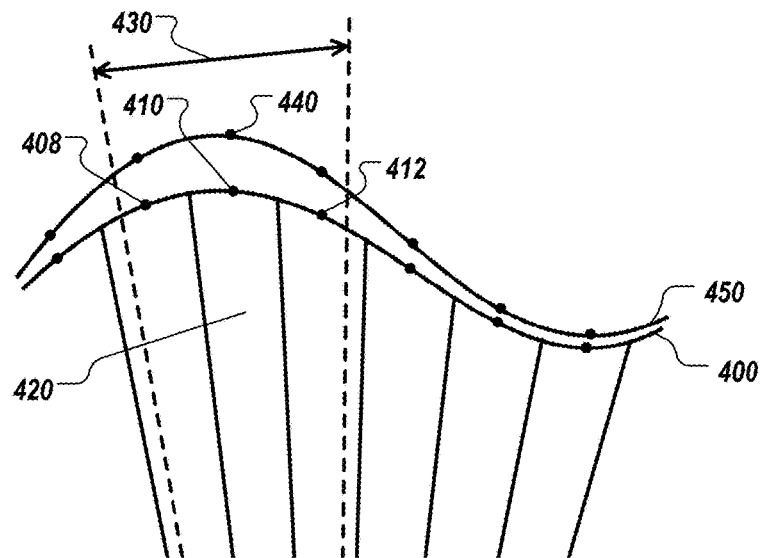
FIGS. 4A-4C are diagrams showing further examples of processes for generating a variable width brim for at least a first layer of a 3D model.

FIG. 4A shows an example of a perimeter 400 of a 3D model. As noted above, the algorithms described herein can be done at the mesh level for a 3D object or in the toolpath domain for a 3D printer. Thus, the perimeter 400 can be a portion of an exterior surface of geometry in a 3D model or a toolpath generated for a 3D printer that will manufacture the object for the 3D model. In either case, the perimeter 400 is broken down into discrete, evenly spaced points. In some implementations, the amount of spacing between these points (i.e., the level of discretization) is a user specified input variable. In some implementations, the level of discretization depends on one or more input variables to the process 300, one or more aspects of the 3D model at hand, or a combination of these. In some implementations, the level of discretization is determined as a multiple of the extruder's nozzle diameter.

In any case, the discretization of the perimeter inherently divides the 3D model up into separate regions for processing. The present description focuses on processing these regions serially, but in some implementation the respective regions (and likewise the respective layers) can be processed in parallel. Referring to FIGS. 3 and 4A together, a next discrete point 410 along the perimeter 400 of the layer of the 3D model is selected 325. The selection 325 of the point 410 inherently selects an associated region 420 of the 3D model in light of the shape of the layer and the level of discretization.

Neighboring points 408, 412 are identified 330 in accordance with a window of convexity 430. In this example, two neighboring points 408, 412 are within the window of convexity 430 and are thus associated with the region 420 by the window of convexity 430, but the number of identified 330 points can be 3, 4, 5, 6, or more. In some implementations, the window of convexity 430 is a user specified input variable. In some implementations, the window of convexity 430 depends on one or more input variables to the process 300, one or more aspects of the 3D model at hand, or a combination of these.

Figure 4B:
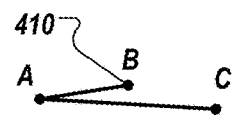

Once the neighboring points are identified 330, a measure of convexity is calculated 335 based on one or more angles between the discrete points 408-412 associated with the region 420. FIG. 4B shows the identified points 408-412 from FIG. 4A, but relabeled as points A, B, C. The convexity/concavity is thus defined as the angle created by the two lines, AB and AC, where the two lines are created by point A to point B and point A to point C.

Figure 4C:
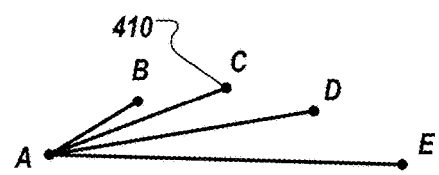

In this example, only one angle is formed since only three points have been identified 335. However, in other cases, more than three points are identified 330 as associated with the region 420 due to a larger window of convexity 430. In such cases, the measure of convexity is calculated 335 as an average (e.g., a weighted average) of angles between the discrete points associated with the region 420. For example, when the window of convexity 430 captures four neighboring points around the point 410, FIG. 4C shows the result, with the points relabeled as points A, B, C, D, E. The convexity/concavity can thus be defined as the weighted average of the angles between the lines AB and AC, AB and AD, AB and AE. In some implementations, each segment of the weighted average is driven by the user and/or driven by other settings and the material used.

At 340, a check is made as to whether any more discrete points remain to be processed for the perimeter. If so, the process 300 selects 325 the next point for processing. Once all the discrete points of the layer have been processed, a check 345 can optionally be made as to whether any more layers are to be processed. In some implementations, only the first layer is processed to generate the variable width brim. In other implementations, two or more layers are processed to generate the variable width brim. While additional layers remain, the process 300 proceeds to discretize 320 one or more perimeters of each respective layer. In some implementations, the number of layers is a user defined input variable. In some implementations, computer simulation is used to determine when the force induced by warping, by a particular feature, on a particular layer, is within a window where a brim can counteract the stresses created by that feature.

Once the layer(s) are fully processed to calculate the measures of convexity, brim extent locations are generated 350 from the measures of convexity. When convexity measurements have been made for more than one layer of the 3D model, theses convexity measurements from the respective layers can be combined, e.g., using a roll off technique, where the first layer is assigned a weight of one, and each succeeding higher layer of the respective layers of the 3D model is assigned a weight that is less than the weight assigned to the preceding lower layer. For example, in some implementations, the weight of each layer is defined by a curve, where the curve can have a linear roll off (e.g., 1.0 times the first layer measurements, plus 0.8 times the second layer measurements, plus 0.6 time the third layer measurements, plus 0.4 times the fourth layer measurements), or the curve can have an exponential roll off (e.g., 1.0 times the first layer measurements, plus 0.5 times the second layer measurements, plus 0.25 time the third layer measurements, plus 0.125 times the fourth layer measurements). In some implementations, the curve specifying the roll of is a user defined curve.

Thus, the brim extent locations are generated 350 either from the convexity measurements for the first layer only, or from a combination of the convexity measurements for the first layer plus one or more additional layers. In either case, the convexity measurements are translated into a distance from the 3D model for the brim in the region of each convexity measurement based on one or more input variables, for example, based on the material to be used for the 3D printing. For instance, ABS shrinks more than PLA so a wider brim is needed for the same object being manufactured using ABS versus PLA. Further, in general, more convexity in a region translates into a wider brim for that region, and less convexity translates into a narrower brim for that region.

Referring again to FIG. 4A, a series of brim extents are shown for the discrete points, including a brim extent 440 corresponding to the point 410. As shown, more convexity in a region results in a wider brim 450 for that region, and less convexity results in a narrower brim 450 in that region. Further, the one or more input variables affect the translation from measured convexity to brim extents. For example, the measured convexity can be first converted into a percentage value, which is then scaled by the maximum and minimum values for the brim, in accordance with:

$$E=cp(b_{max}-b_{min})+b_{min}$$

where cp is the percentage measure of convexity, $b_{max}$ is the maximum value for the brim width, $b_{min}$ is the minimum value for the brim width, and E is the distance from the 3D model for the brim extent. In some implementations, the distance E is the distance along a line connecting the discrete point on the perimeter with a center of the 3D model in the layer, as shown in FIG. 4A. In other implementations, the distance E is the distance along a line that is normal to the perimeter at the discrete point. Other implementations are also possible.

With the brim extents defined, the variable width brim is created 355 from the generated brim extent locations, and the variable width brim is output 355. In some implementations, the brim perimeter is created by fitting one or more curves to the locations, as shown in FIG. 4A. In some implementations, the brim perimeter is created by connecting the brim extent locations with straight lines. Moreover, in some implementations, the brim has more than one layer. For example, if the computer simulation calculates that a force generated by warping of the feature(s) exceeds the local force dispersion created by the brim, then additional layers of brim will be generated until all simulated force is counteracted. In some implementations, the number of brim layers is a setting determined by the user.

In addition, the area between the brim perimeter and the model layer is filled in to create the brim, which provides the extra adhesion for the layer during 3D printing. In some implementations, this area is composed of continuous infill. In other implementations, only part of this area is filled in. For example, in some implementations, the variable width brim has a perforated edge where the brim contacts the 3D object to be manufactured. This provides the extra adhesion during 3D printing, but also facilitates removal of the brim after the 3D object is done being manufactured. To generate the perforated edge, one or more shapes (e.g., ellipses, ovoids, regular or irregular polygons, etc.) can be removed from what would otherwise be continuous infill for the brim.

Figure 5A:
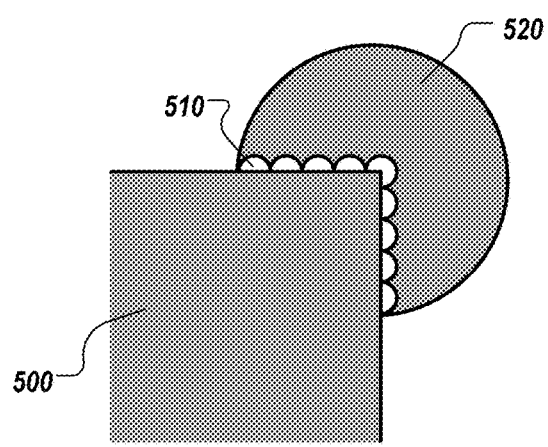
FIGS. 5A and 5B are diagrams showing examples of brims, which have perforated edges, generated for layers of respective 3D models.
Figure 5B:
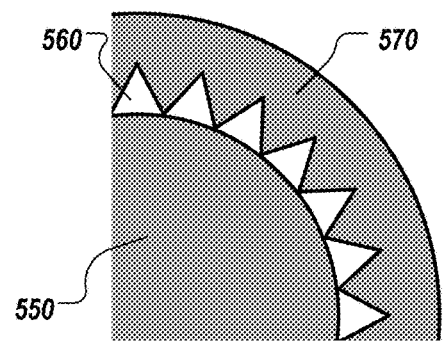

FIGS. 5A and 5B are diagrams showing examples of brims, which have perforated edges, generated for layers of respective 3D models. In some implementations, generating the perforated edge involves specifying the areas to be excluded from the otherwise continuous infill of the brim by distributing evenly spaced holes along an offset of the perimeter of the first layer of the model. As shown in FIG. 5A, the holes can be circles 510 distributed along a perimeter of the first layer of a 3D model 500, with an offset of zero in this case, to specify the areas of a brim 520 that will not be filled in. Other shapes for the holes are also possible.

As shown in FIG. 5B, the holes can be triangles 560 distributed along a perimeter of the first layer of a 3D model 550, with a positive offset in this case, to specify the areas of a brim 570 that will not be filled in. Various offsets, including negative offsets, are possible. Further, these techniques for generating a perforated edge for a brim can be employed with a brim that does not vary with convexity.

Once created, the brim is output 355 for use in preventing warping during the additive manufacturing of the object from the 3D model using the thermoplastic material delivery apparatus. For example, the 3D model and the brim geometry for the 3D model can be saved together for later loading and printing. As another example, the brim geometry for the 3D model can be output to another program for further processing, such as to generate tool path data for a 3D printer to build a 3D object in accordance with the 3D model and the brim that has been created for the 3D model. As yet another example, the brim can be created in the toolpath domain directly, and so the toolpath specification for the brim in the layer can be sent to the 3D printer for additive manufacturing. Moreover, in some implementations, the brim and the object are both printed on a raft, rather than directly on the build platform.

Figure 6:
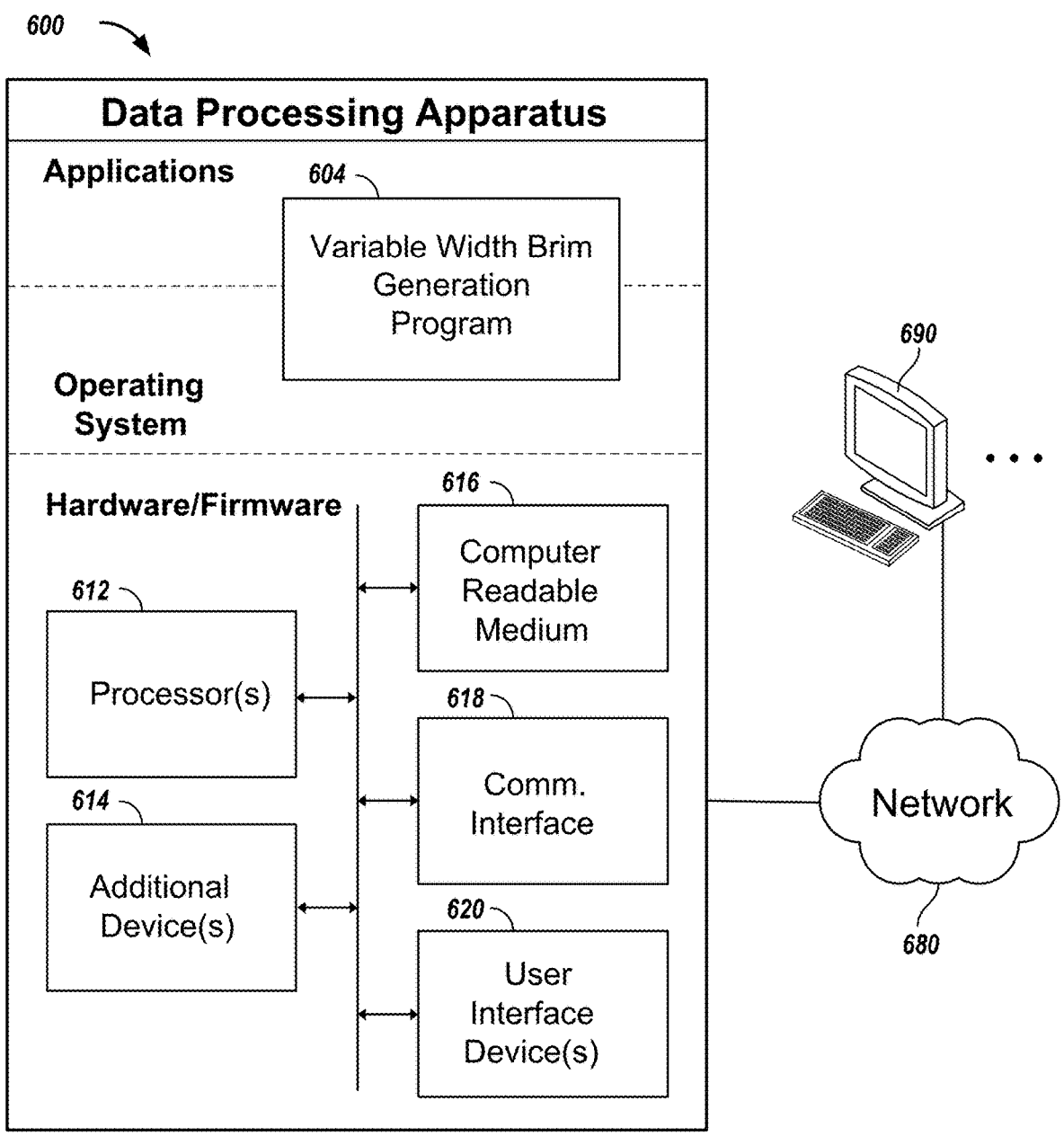
FIG. 6 is a schematic diagram of a data processing system including a data processing apparatus, which can be programmed to implement the processes described herein.

FIG. 6 is a schematic diagram of a data processing system including a data processing apparatus 600, which can be programmed as a client or as a server. The data processing apparatus 600 is connected with one or more computers 690 through a network 680. While only one computer is shown in FIG. 6 as the data processing apparatus 600, multiple computers can be used. The data processing apparatus 600 includes various software modules, which can be distributed between an applications layer and an operating system. These can include executable and/or interpretable software programs or libraries, including tools and services of a variable brim generation program 604, such as described above. The number of software modules used can vary from one implementation to another. Moreover, the software modules can be distributed on one or more data processing apparatus connected by one or more computer networks or other suitable communication networks.

The data processing apparatus 600 also includes hardware or firmware devices including one or more processors 612, one or more additional devices 614, a computer readable medium 616, a communication interface 618, and one or more user interface devices 620. Each processor 612 is capable of processing instructions for execution within the data processing apparatus 600. In some implementations, the processor 612 is a single or multi-threaded processor. Each processor 612 is capable of processing instructions stored on the computer readable medium 616 or on a storage device such as one of the additional devices 614. The data processing apparatus 600 uses its communication interface 618 to communicate with one or more computers 690, for example, over the network 680. Examples of user interface devices 620 include a display, a camera, a speaker, a microphone, a tactile feedback device, a keyboard, and a mouse. The data processing apparatus 600 can store instructions that implement operations associated with the modules described above, for example, on the computer readable medium 616 or one or more additional devices 614, for example, one or more of a floppy disk device, a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular implementations of the invention have been described. Other implementations are within the scope of the following claims. In addition, the actions recited in the claims can be performed in a different order and still achieve desirable results.

What is claimed is:

1. A method comprising:
obtaining a three dimensional (3D) model of an object to be additively manufactured using a thermoplastic material delivery apparatus;
generating a variable width brim for at least a first layer of the 3D model, wherein a width of the brim varies from a maximum value to a minimum value at different locations adjacent at least the first layer of the 3D model, and the generating comprises
discretizing a perimeter of the first layer of the 3D model to identify discrete points along the perimeter of the first layer of the 3D model,
determining a convexity for a region of the 3D model by calculating at least one angle between at least two lines formed between at least three of the discrete points associated with the region, and
varying the width of the brim in accordance with an amount of convexity of the 3D model in regions corresponding to the different locations; and
outputting the variable width brim for use in preventing warping during the additive manufacturing of the object from the 3D model using the thermoplastic material delivery apparatus.

2. The method of claim 1, wherein the minimum value is zero, and the maximum value is a user input value.

3. The method of claim 1, comprising setting the maximum value in accordance with properties of a thermoplastic material to be used by the thermoplastic material delivery apparatus to additively manufacture the object from the 3D model.

4. The method of claim 1, wherein generating the variable width brim comprises identifying how many of the discrete points are associated with the region based on a window of convexity being measured, and determining the convexity for the region comprises calculating a weighted average of angles between at least three lines formed between at least four of the discrete points associated with the region.

5. A method comprising:
obtaining a three dimensional (3D) model of an object to be additively manufactured using a thermoplastic material delivery apparatus;
generating a variable width brim for at least a first layer of the 3D model, wherein a width of the brim varies from a maximum value to a minimum value at different locations adjacent at least the first layer of the 3D model, and the generating comprises varying the width of the brim in accordance with an amount of convexity of the 3D model in regions corresponding to the different locations, wherein varying the width of the brim comprises setting the width based on a weighted average of convexity determined for respective layers, including the first layer, of the 3D model; and
outputting the variable width brim for use in preventing warping during the additive manufacturing of the object from the 3D model using the thermoplastic material delivery apparatus.

6. The method of claim 5, wherein the first layer is assigned a weight of one, and each succeeding higher layer of the respective layers of the 3D model is assigned a weight that is less than the weight assigned to the preceding lower layer.

7. The method of claim 1, wherein generating the variable width brim comprises creating a perforated edge in the brim where the brim contacts the 3D model.

8. The method of claim 7, wherein creating the perforated edge in the brim comprises distributing evenly spaced holes along a perimeter of the first layer of the 3D model.

9. The method of claim 1, comprising using a 3D modelling program to perform the generating and the varying at a mesh level of the 3D model, and wherein the outputting comprises saving the 3D model with the variable width brim added thereto.

10. The method of claim 1, comprising using a slicer program to perform the generating and the varying during conversion of the 3D model to a toolpath domain of the thermoplastic material delivery apparatus, and wherein the outputting comprises sending a toolpath specification document to the thermoplastic material delivery apparatus for additive manufacturing, wherein the toolpath specification document includes slices of the 3D model and the variable width brim.

11. A non-transitory computer-readable medium encoding instructions operable to cause data processing apparatus to perform operations comprising:
obtaining a three dimensional (3D) model of an object to be additively manufactured using a thermoplastic material delivery apparatus;
generating a variable width brim for at least a first layer of the 3D model, wherein a width of the brim varies from a maximum value to a minimum value at different locations adjacent at least the first layer of the 3D model, and the generating comprises
discretizing a perimeter of the first layer of the 3D model to identify discrete points along the perimeter of the first layer of the 3D model,
determining a convexity for a region of the 3D model by calculating at least one angle between at least two lines formed between at least three of the discrete points associated with the region, and
varying the width of the brim in accordance with an amount of convexity of the 3D model in regions corresponding to the different locations; and
outputting the variable width brim for use in preventing warping during the additive manufacturing of the object from the 3D model using the thermoplastic material delivery apparatus.

12. The non-transitory computer-readable medium of claim 11, wherein the minimum value is zero, and the maximum value is a user input value.

13. The non-transitory computer-readable medium of claim 11, the operations comprising setting the maximum value in accordance with properties of a thermoplastic material to be used by the thermoplastic material delivery apparatus to additively manufacture the object from the 3D model.

14. The non-transitory computer-readable medium of claim 11, wherein generating the variable width brim comprises identifying how many of the discrete points are associated with the region based on a window of convexity being measured, and determining the convexity for the region comprises calculating a weighted average of angles between at least three lines formed between at least four of the discrete points associated with the region.

15. A non-transitory computer-readable medium encoding instructions operable to cause data processing apparatus to perform operations comprising:

obtaining a three dimensional (3D) model of an object to be additively manufactured using a thermoplastic material delivery apparatus;

generating a variable width brim for at least a first layer of the 3D model, wherein a width of the brim varies from a maximum value to a minimum value at different locations adjacent at least the first layer of the 3D model, and the generating comprises varying the width of the brim in accordance with an amount of convexity of the 3D model in regions corresponding to the different locations, wherein varying the width of the brim comprises setting the width based on a weighted average of convexity determined for respective layers, including the first layer, of the 3D model; and outputting the variable width brim for use in preventing warping during the additive manufacturing of the object from the 3D model using the thermoplastic material delivery apparatus.

16. The non-transitory computer-readable medium of claim 15, wherein the first layer is assigned a weight of one, and each succeeding higher layer of the respective layers of the 3D model is assigned a weight that is less than the weight assigned to the preceding lower layer.

17. The non-transitory computer-readable medium of claim 15, wherein generating the variable width brim comprises creating a perforated edge in the brim where the brim contacts the 3D model.

18. The non-transitory computer-readable medium of claim 17, wherein creating the perforated edge in the brim comprises distributing evenly spaced holes along a perimeter of the first layer of the 3D model.

19. The non-transitory computer-readable medium of claim 15, the operations comprising using a 3D modelling program to perform the generating and the varying at a mesh level of the 3D model, and wherein the outputting comprises saving the 3D model with the variable width brim added thereto.

20. The non-transitory computer-readable medium of claim 15, the operations comprising using a slicer program to perform the generating and the varying during conversion of the 3D model to a toolpath domain of the thermoplastic material delivery apparatus, and wherein the outputting comprises sending a toolpath specification document to the thermoplastic material delivery apparatus for additive manufacturing, wherein the toolpath specification document includes slices of the 3D model and the variable width brim.

* * * * *